United States Patent
Iddings

(10) Patent No.: US 8,494,939 B2
(45) Date of Patent: Jul. 23, 2013

(54) METHOD FOR CORROBORATING A GAMING JACKPOT PAYMENT

(75) Inventor: Cara L. Iddings, Las Vegas, NV (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 13/569,047

(22) Filed: Aug. 7, 2012

(65) Prior Publication Data

US 2012/0303530 A1 Nov. 29, 2012

Related U.S. Application Data

(63) Continuation of application No. 10/723,129, filed on Nov. 25, 2003, now abandoned.

(60) Provisional application No. 60/470,730, filed on May 14, 2003.

(51) Int. Cl.
*G06Q 40/00* (2012.01)

(52) U.S. Cl.
USPC .......................................................... 705/35

(58) Field of Classification Search
USPC ................. 705/35; 463/25; 273/138
See application file for complete search history.

(56) References Cited

U.S. PATENT DOCUMENTS

| | | | |
|---|---|---|---|
| 4,283,709 A | 8/1981 | Lucero et al. | |
| 5,249,800 A * | 10/1993 | Hilgendorf et al. | 463/27 |
| 5,280,909 A | 1/1994 | Tracy | |
| 5,470,079 A | 11/1995 | LeStrange et al. | |
| 5,580,310 A * | 12/1996 | Orus et al. | 463/16 |
| 5,611,730 A | 3/1997 | Weiss | |
| 5,655,961 A | 8/1997 | Acres et al. | |
| 5,836,817 A | 11/1998 | Acres et al. | |
| 6,071,190 A | 6/2000 | Weiss et al. | |
| 6,110,044 A * | 8/2000 | Stern | 463/29 |
| 6,312,333 B1 | 11/2001 | Acres | |
| 6,675,152 B1 * | 1/2004 | Prasad et al. | 705/64 |
| 6,712,695 B2 * | 3/2004 | Mothwurf et al. | 463/25 |
| 6,892,938 B2 * | 5/2005 | Solomon | 235/375 |
| 6,984,175 B2 * | 1/2006 | Nguyen et al. | 463/25 |
| 7,300,349 B2 * | 11/2007 | Walker et al. | 463/17 |
| 2003/0013521 A1 | 1/2003 | Cole et al. | |
| 2003/0069059 A1 * | 4/2003 | Stanek | 463/17 |
| 2003/0162591 A1 * | 8/2003 | Nguyen et al. | 463/29 |

FOREIGN PATENT DOCUMENTS

EP 0 443 420 * 2/1991

OTHER PUBLICATIONS

Mills, J. R.: Control Testing in the Gaming Industry, Jan. 1991, CPA Journal: 61, 1; ABI/INFORM Global, pp. 34-37.*
PR Newswire: Acres Gaming Speaks at The Red Chip Review Investor Conference, Mar. 19, 1998, New York, pp. 1-2.*
Mills, John R.: Control Testing in the Gaming Industry, Jan. 1991, The CPA Journal, 61, 1: ABI/INFORM Global, pp. 34-37.*
US Notice of Panel Decision from Pre-Appeal Brief Review dated Jul. 23, 2012 issued in U.S. Appl. No. 10/723,129.

(Continued)

*Primary Examiner* — Bijendra K Shrestha
(74) *Attorney, Agent, or Firm* — Foley & Lardner LLP

(57) ABSTRACT

A method for authorizing a witness-less manual payment of a gaming jackpot includes comparing a jackpot transaction value from a payment user to a maximum witness-less hand-payment jackpot value and to a jackpot value from the gaming machine. Confirmed jackpots of suitable value can be authorized for hand-payment without a corroborating human witness. The maximum value is selectable by the casino.

24 Claims, 6 Drawing Sheets

OTHER PUBLICATIONS

US Office Action dated Mar. 4, 2010 issued in U.S. Appl. No. 10/723,129.

US Office Action dated Aug. 19, 2011 issued in U.S. Appl. No. 10/723,129.

US Office Action dated Nov. 12, 2010 issued in U.S. Appl. No. 10/723,129.

US Final Office Action dated Jan. 30, 2012 issued in U.S. Appl. No. 10/723,129.

US Final Office Action dated Apr. 28, 2011 issued in U.S. Appl. No. 10/723,129.

AU First Examination Report dated Jun. 12, 2009 issued in Application No. 2004201794.

GB Examination Report dated Apr. 2, 2007 issued in Application No. 0409931.3.

GB Examination Report dated Jan. 19, 2006 issued in Application No. 0409931.3.

Mills, J. R., "Control Testing in the Gaming Industry," *The CPA Journal* 61:1, Jan. 1991, ABI/INFORM Global, pp. 34-37.

* cited by examiner

METHOD FOR CORROBORATING A GAMING JACKPOT PAYMENT

RELATED APPLICATION DATA

This application is a continuation of Ser. No. 10/723,129, filed Nov. 25, 2003, in which priority is claimed to provisional application Ser. No. 60/470,730, filed May 14, 2003, both applications of which are incorporated by reference in their entirety for all purposes.

BACKGROUND OF THE INVENTION

The present invention is related to the field of gaming jackpot manual payments, and more specifically to a method for electronically corroborating a jackpot manual payment to a player.

Gaming machines operate via collection of player bets at the machine. A gaming machine is structured to award a winning value (jackpot) on a random basis. The gaming machine further can award a variety of jackpot values based on different parameters, such as bet amount, bet multipliers, combinational factors, and the structure and rules of the particular game.

Jackpot awards can be paid to a winning player via triggered dispensing of coins or other objects of value from the gaming machine. Gaming machine dispensing is generally used for lower value jackpots. For larger jackpot values, however, unsupervised dispensing from the gaming machine is undesirable as available storage space in the gaming machine for coins or tokens is limited. Further, unsupervised jackpot payments through a gaming machine are more difficult to regulate and can provide opportunities for theft.

As an alternative to gaming machine dispensing, casino personnel can designate a casino payment attendant to hand-pay a jackpot amount to a winning player. This "hand-pay" procedure addresses the above concerns, and further increases the player's gaming experience in receiving personalized attention from the casino staff.

Unfortunately, hand-payment of a jackpot presents several disadvantages. Jackpot hand-payment by a single attendant without a corroborating witness also offers the opportunity for employee fraud and embezzlement. The requirement for payment by a casino employee (casino payer) increases the labor cost of the casino.

Moreover, casinos require two casino personnel to review the jackpot and witness the jackpot payment to the winning player, as is mandated by state or other governmental regulation of gaming operations. The time required to verify and complete a witnessed jackpot payment increases the overall time for the jackpot payment process.

As well, casinos typically suspend or lock a winning gaming machine until the jackpot can be verified and paid. The player's gaming experience thus is negatively impacted: the player must wait for the jackpot payment and is unable to resume gaming while the gaming machine is suspended. The time during which the gaming machine is locked also negatively impacts potential casino revenue.

A player may play a gaming machine for a period of time, accumulating winnings on the gaming machine, e.g., as credits. At the end of play, the player may wish to "cash out" and receive the accumulated winnings as cash or other takeaway value. If the cash-out amount is greater than an amount traditionally paid from the hopper, casinos generally employ the conventional payment procedure detailed above for hand payment of a jackpot.

The invention will become more readily apparent from the following Detailed Description, which proceeds with reference to the drawings, in which:

DETAILED DESCRIPTION OF THE PREFERRED EMBODIMENT(S)

Generally, the present invention provides a method for electronically witnessing a jackpot hand-payment. More particularly, the present method facilitates hand-payment of a gaming jackpot by a single casino employee without a human witness.

The basic casino hardware generally includes one or more networked gaming machines, such as an array of slot machines. An example modern gaming network is illustrated in U.S. Pat. No. 6,254,483B1, assigned to the assignee of the present invention, the teachings of which are incorporated herein in their entirety for all purposes.

Also coupled to the gaming network are one or more jackpot center servers typically located in a secure area off the casino floor. As well, a casino also can include on the casino floor a floor jackpot (FJP) station.

Figure 1:
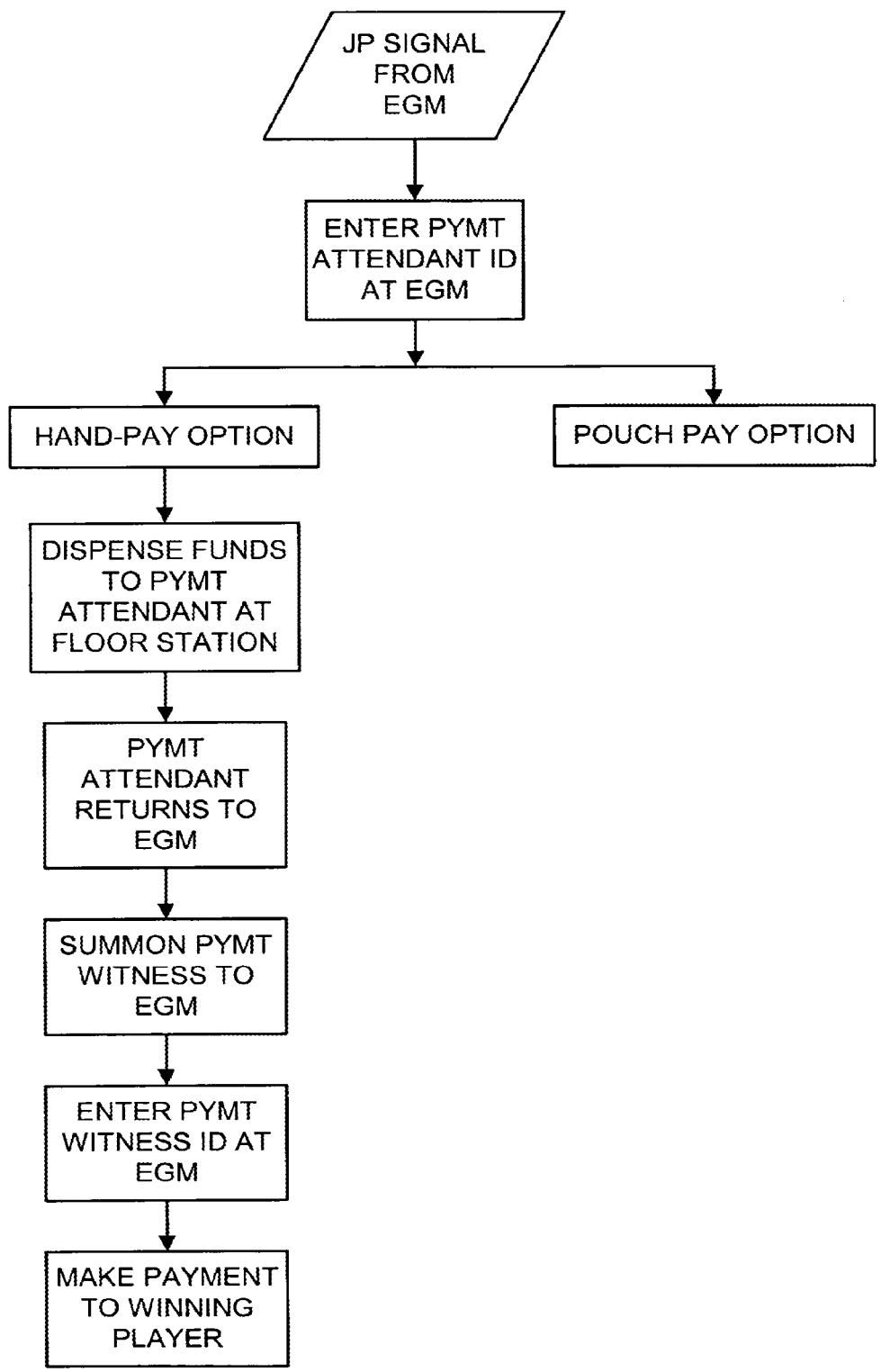
FIG. 1 is a flowchart showing a conventional method for a witnessed hand-payment of a gaming jackpot.

In a conventional jackpot hand-payment scheme as shown in FIG. 1, a gaming player wins a jackpot and a jackpot signal is sent from a gaming machine. For a networked gaming machine, the jackpot signal can be communicated to the jackpot center server that is coupled to the gaming network.

A payment attendant goes to the gaming machine and inputs a code to initiate a jackpot payment transaction. The gaming machine usually is suspended at this point, retaining the jackpot information and prohibiting further play.

Next, the payment attendant goes to the FJP station to complete the transaction. The payment attendant receives a jackpot payment form and funds with which to pay the winning player.

The payment attendant then returns to the gaming machine. Another attendant, serving as a jackpot payment witness, also must be present at the gaming machine. The payment attendant then can transfer funds equal to the jackpot amount to the winning player, with the second attendant witnessing the transfer.

The witnessing attendant must record his physical presence at the payment event, either by inputting a code into the gaming machine or by signing the jackpot payment form.

Figure 2:
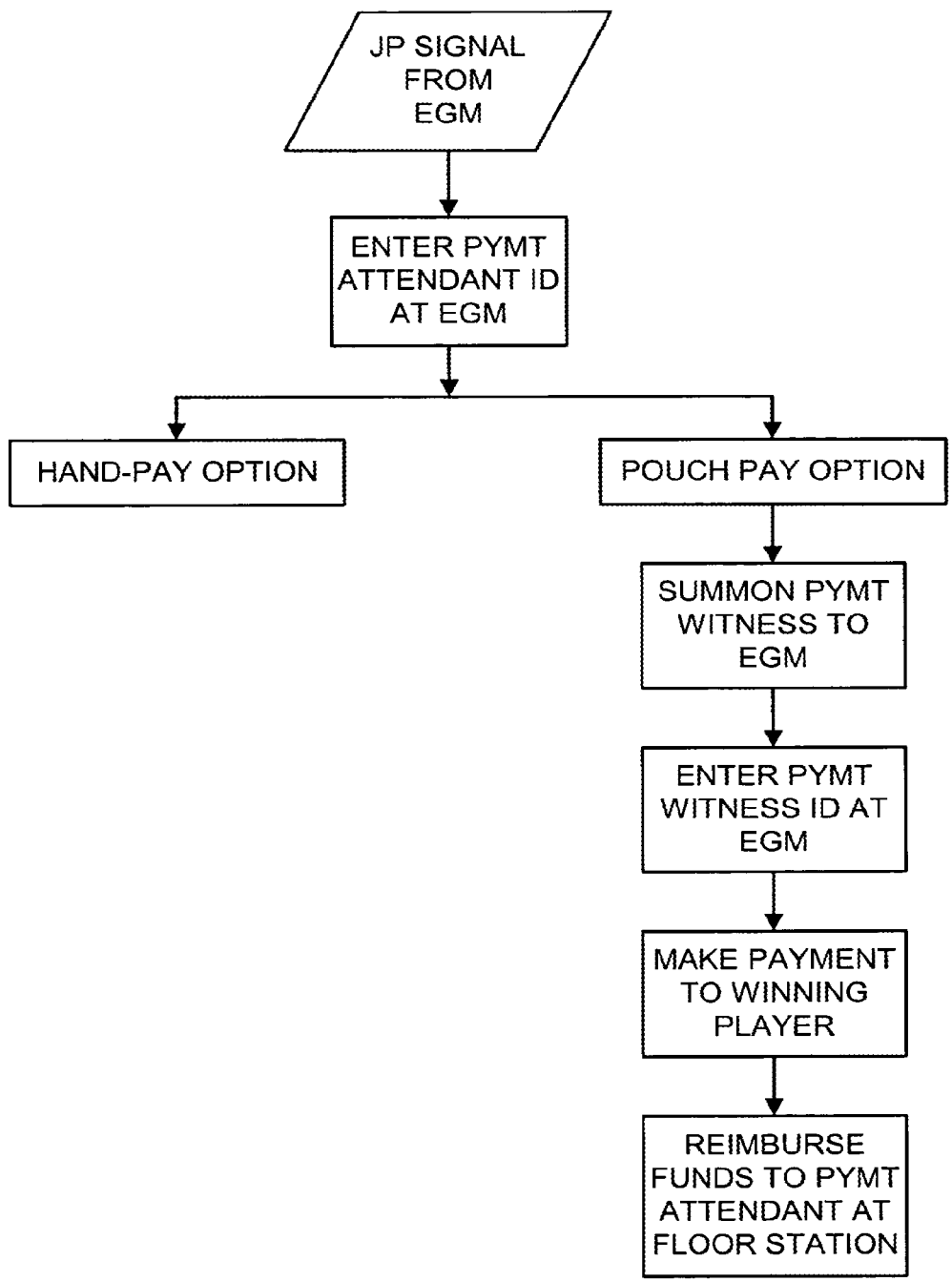
FIG. 2 is a flowchart showing a conventional method for a witnessed pouch-payment of a gaming jackpot.

As a variation of this scheme, a prior art "pouch pay" method can be used for smaller jackpot amounts. In this variation illustrated in FIG. 2, the payment attendant can be supplied by the casino with an amount of funds. If the jackpot won by the player is less than a maximum amount selectable by the casino, the payment attendant is authorized to immediately pay the jackpot amount to the player.

In a pouch-pay method, the payment attendant can input a code and thereby request a witnessing attendant to come to the gaming machine. The witnessing attendant then can witness the jackpot payment (i.e., transfer of value to the player) and evidence his presence via entry of a code into the gaming machine. The payment attendant later can initiate and complete the jackpot payment transaction in the network. A jackpot payment form generated by the payment attendant can bear the witnessing attendant's coded entry as proof that the jackpot payment was witnessed by the witnessing attendant.

In either case, it can be appreciated that manual payment of a jackpot to a player requires two casino employees at the gaming machine. This requirement results in delay, increases casino operating costs and reduces revenues.

Figure 3:
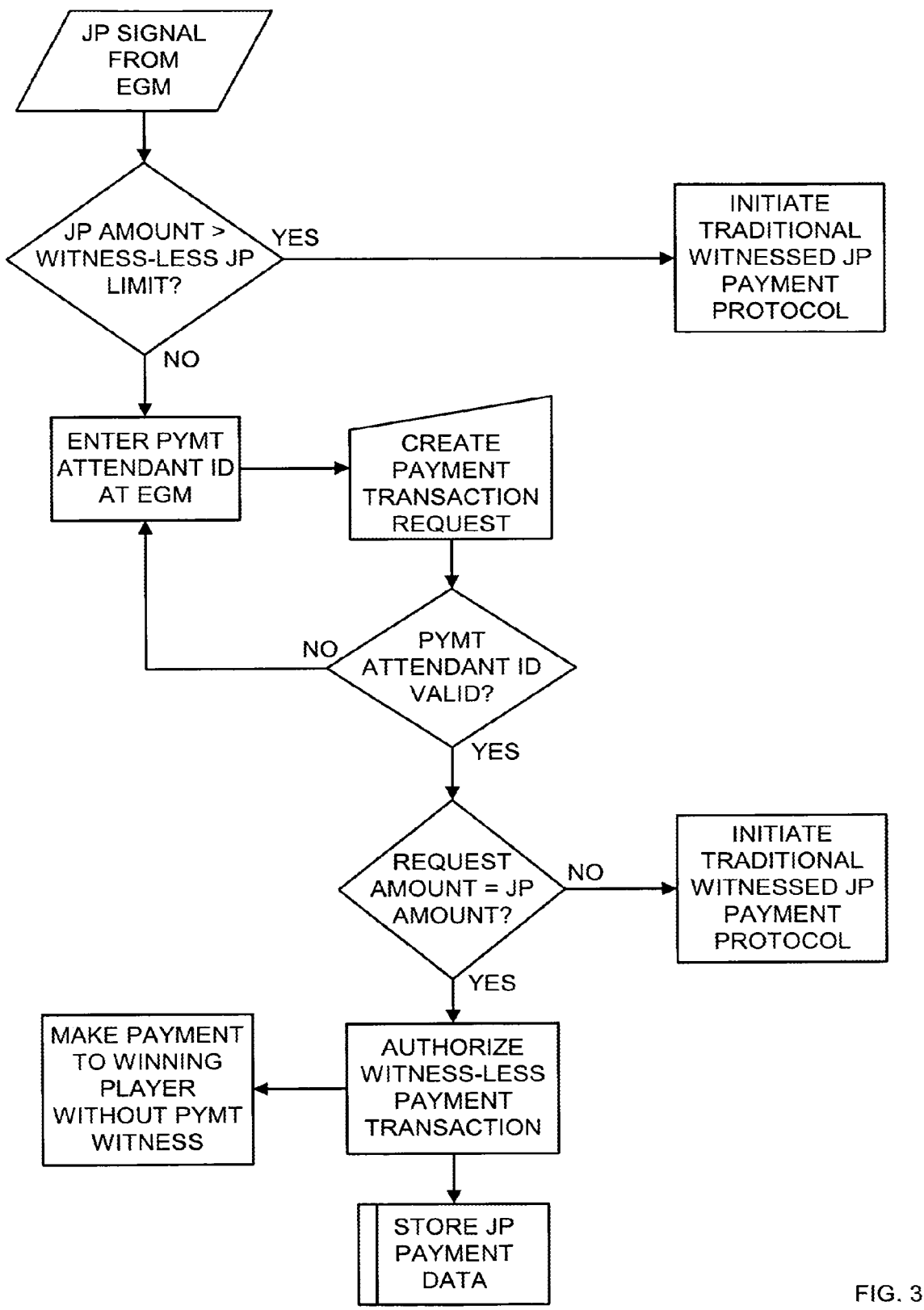
FIG. 3 is a flowchart showing a witness-less pouch-payment of a gaming jackpot according to the present disclosure.

Turning to FIG. 3, the present method for witness-less corroboration of a jackpot payment generally includes receiving a jackpot winning signal from a gaming machine. The jackpot signal can include a jackpot value of a player, as well as gaming machine identification data, chronological data, and the like. The gaming machine typically may suspend further gaming play thereon until the jackpot is verified and paid.

The network can at this point verify that the jackpot value is not greater than a maximum witness-less jackpot value can be set by the casino. If so, conventional witnessed hand-payment methodology can be employed.

If the jackpot value is suitable for witness-less hand-payment, a jackpot payment user enters an identification code at the electronic gaming machine (EGM) to initiate a jackpot payment transaction request. The identification code can be validated to ensure that the jackpot payment user is authorized to proceed with a witness-less jackpot payment.

Typically, the jackpot payment user does not carry sufficient cash or other value forms to pay the jackpot without first being dispensed funds from a remote station, such as a floor jackpot (FJP) station. In this scenario, the payment user enters the user identification code at the FJP and selects the transaction initiated at the EGM.

The network can then compare the jackpot value of the jackpot signal from the EGM with the jackpot payment request value. The jackpot request amount alternatively can be verified by the attendant selecting "OK" or a similar entry.

In cases wherein the user attempts or is required to pay an amount other than the jackpot value, the network can decline a witness-less transaction and require instead a conventional witnessed jackpot payment. It is preferable that amending a jackpot amount should require entry of an ID code of a supervisor or other authorized casino employee.

If the jackpot value signaled by the EGM matches the requested jackpot payment value, the network can dispense the appropriate funds to the jackpot payment user and authorize an unwitnessed jackpot payment to the gaming player. Data relevant to the transaction request and payment can also be stored for future use.

Figure 4:
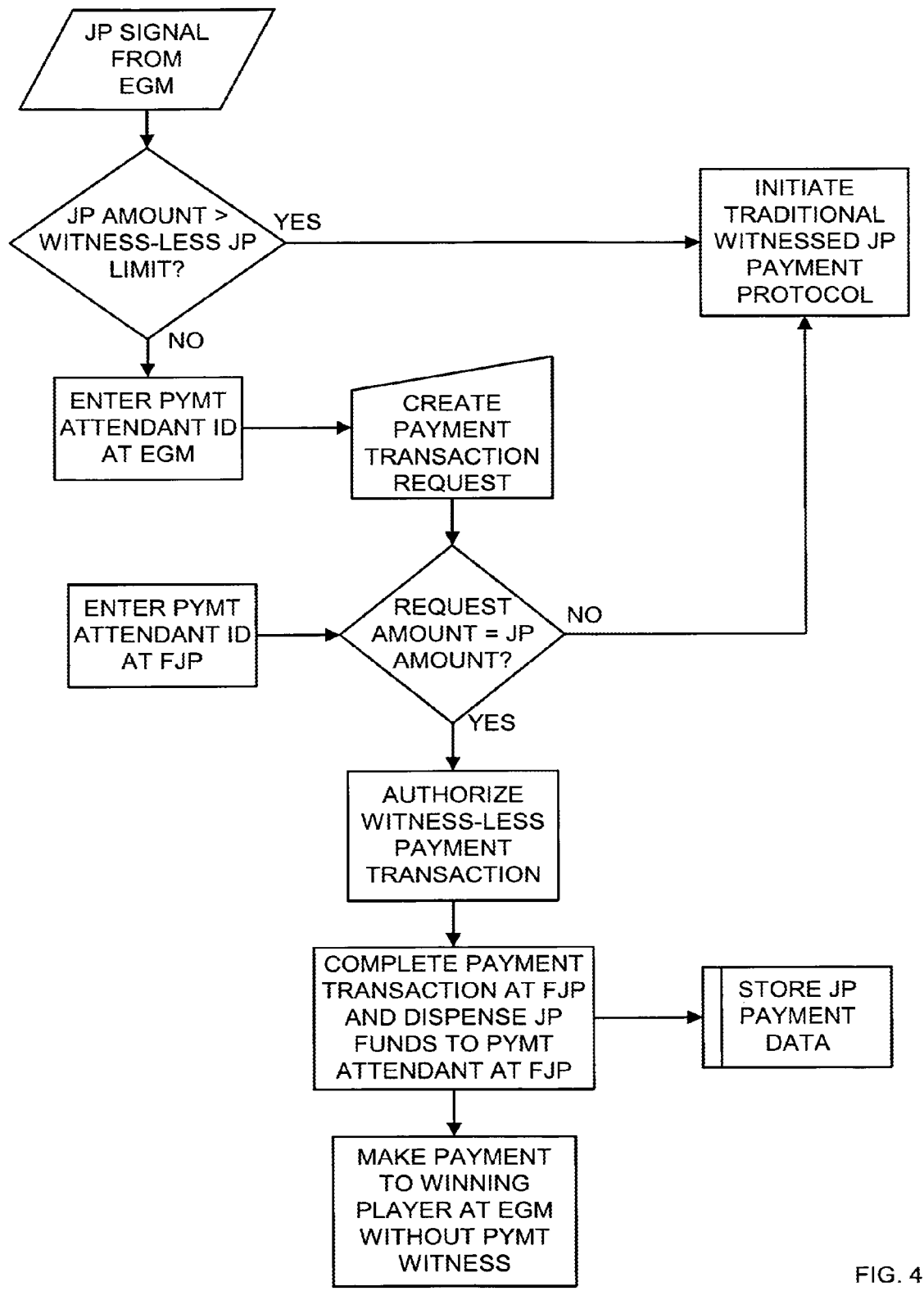
FIG. 4 is a flowchart showing a first alternative method for a witness-less hand-payment of a gaming jackpot.

A witness-less hand-payment of a jackpot is illustrated in FIG. 4. The payment attendant is alerted to the jackpot event, confirms the jackpot at the gaming machine, and initiates a jackpot payment transaction by, e.g., swiping a card in a networked card reader and/or inputting a code.

Initiation of a jackpot payment transaction generates a payment user transaction signal, which is communicated to the jackpot center server. The transaction signal can include a payment user identifier, a jackpot transaction value, and other data relevant to the jackpot transaction.

The jackpot center server can verify the jackpot by comparing the jackpot transaction value to a maximum jackpot witness-less manual payment value. The jackpot center server further generates a confirmed jackpot value if the jackpot value of the jackpot winning signal is equal to the jackpot transaction value of the transaction signal.

If a confirmed jackpot value signal is not generated, the jackpot center server will decline to authorize a witness-less jackpot payment. The jackpot center server can generate an unconfirmed jackpot value signal for use in a casino's internal financial control. A witness summoning signal also can be generated and a conventional witnessed hand-payment scheme can be followed.

The jackpot center server further can verify the jackpot amount is eligible for witness-less payment. For example, the jackpot transaction value can be compared to a maximum jackpot witness-less manual payment value. The maximum jackpot witness-less manual payment value preferably is a selectable value, such that the casino can determine a minimum financial level above which a witnessing attendant will be required.

Although FIG. 4 shows the jackpot request value verification before input of a payment user ID code, the two steps can be reversed without material difference to the described method. In other words, the system alternatively can receive a payment attendant ID code before verifying the jackpot request amount.

If the jackpot value is such that it is eligible for witness-less payment and a confirmed jackpot value signal is generated, the jackpot center server can authorize the payment attendant to transfer the confirmed jackpot value to the player without a requirement for a corroborating payment witnessing user. If the jackpot value of the jackpot winning signal is greater than the maximum witness-less value, the jackpot center server will decline to authorize a witness-less payment.

In the case of denial of authorization to proceed without a witnessing attendant, the jackpot center server can issue a witness summoning signal to summon a witnessing attendant to the gaming machine per a conventional witnessed hand-payment.

Such authorization typically is required for the payment attendant to be dispensed funds sufficient to make the jackpot hand-payment. Dispensing of funds or other value to the payment attendant can be via a casino cash dispensing employee, automated funds dispenser, or other means.

The FJP also creates a record of the witness-less jackpot value transfer (e.g., prints a jackpot payment transaction receipt), including indicia indicating that authorization was granted for hand-payment without the requirement for a corroborating payment witnessing user. For example, the jackpot payment form can bear the legend "Witness Not Required" or "Electronically Witnessed" in place of a space for a witness signature.

The payment attendant, having caused a jackpot payment form to be generated and having received funds, can return to the gaming machine. The payment attendant then pays the player, without a witnessing attendant, and unlocks the gaming machine for further gaming play.

Payment of the jackpot value to the winning player can be accomplished by dispensing cash, check or tokens for the amount of the jackpot value, a printed jackpot ticket, or one or more objects of value. These forms of payment are known to those in the art. For casinos so equipped, the payment attendant also can assign a credit equal to the jackpot value to an account of the winning player.

The jackpot payment form can be turned in to the casino accounting or auditing department. The form alerts accounting or auditing personnel that a witnessing attendant signature was not required for the transaction, obviating the need to match a jackpot payment form with a witnessing attendant code or signature.

As was mentioned above, a witnessing attendant of a conventional "pouch pay" may not physically sign a jackpot payment form during the witnessed payment. Instead, the accounting and/or internal control department of the casino matches the code inputted by the witnessing attendant at the gaming machine with the unsigned jackpot payment form later generated by the payment attendant. This step is eliminated in the present method.

In conventional gaming establishments, all pouch-pay transactions have a witness thereto; only machine-dispensed jackpot values need not be witnessed. The present system and method provide a jackpot payment verification protocol less labor-intensive than conventional systems. A pouch payment conducted in accordance with the method described herein can be executed with one attendant v.

the two attendants currently standard in the gaming industry. As well, the number of witnesses to a jackpot payment typically grows with the jackpot amount. Therefore, it can be could inferred that one fewer attendant is required with the present system verification than with conventional methods.

The above method can similarly be employed for a player wishing to cash out and receive accumulated winnings. If the cash-out amount is larger than is traditionally dispensed from the hopper or is a larger amount than the casino would prefer to print on a jackpot ticket for the player to redeem, the conventional cash-out procedure can be efficaciously replaced with the present method.

Figure 5:
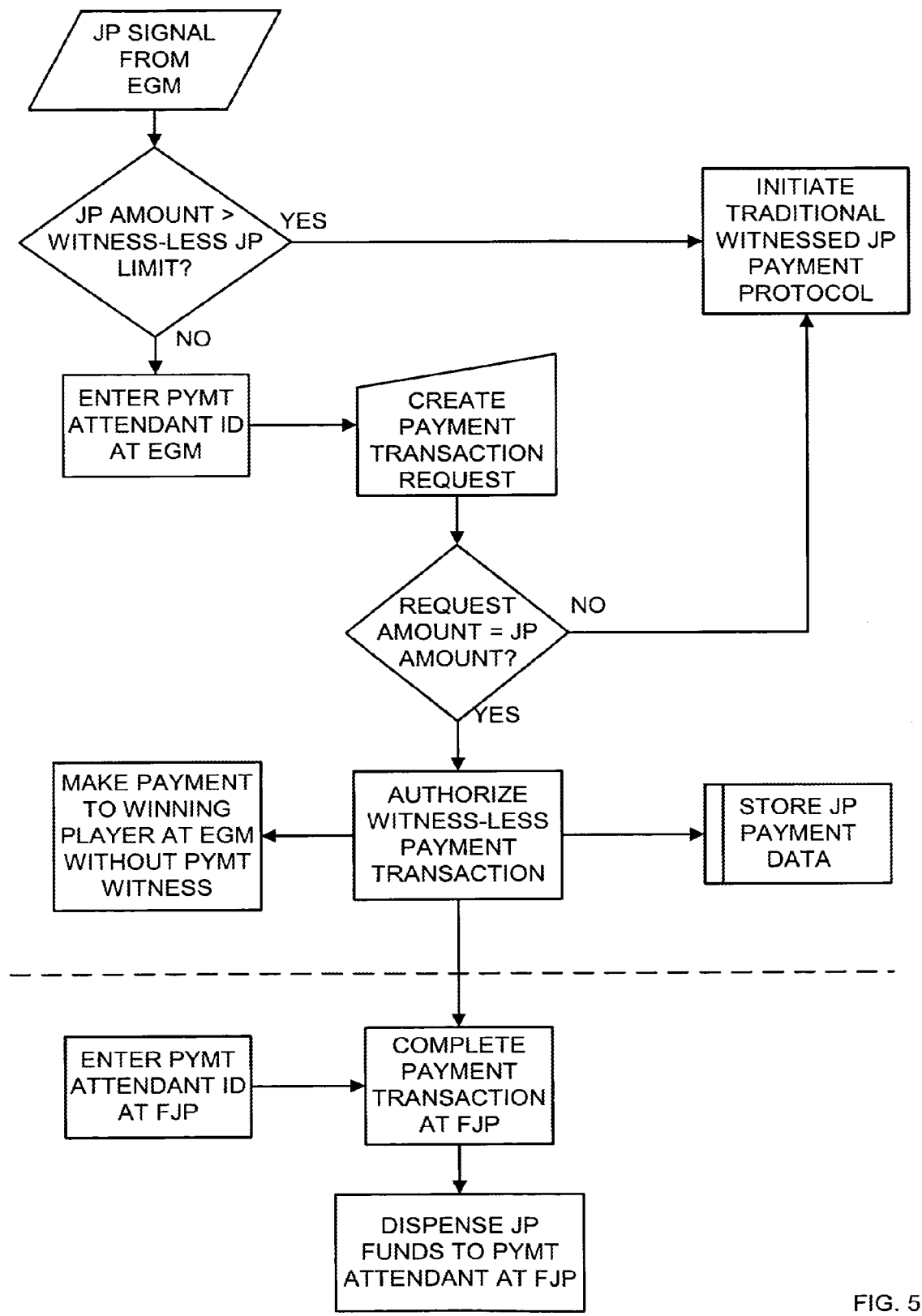
FIG. 5 is a flowchart showing a witness-less pouch-payment of a gaming jackpot according to the present disclosure.

The present method also can be employed in a "pouch-pay" of a jackpot amount, as illustrated in FIG. 5. When the payment attendant inputs a code at the gaming machine, the jackpot processing center can detect the jackpot value through the jackpot signal or the payment user transaction signal and determine if the jackpot value qualifies for witness-less hand-payment.

If so, a message can be sent to the gaming machine, instructing the payment attendant that a witnessing attendant is not required. The payment attendant then can pay the player immediately with on-hand funds.

The jackpot payment user subsequently can complete the jackpot transaction at the FJP. Generally, the payment user would enter an identification code at the FJP, and select the jackpot transaction corresponding to the just-paid jackpot. The system can confirm that the user's reimbursement amount is not greater than the jackpot value that was paid to the gaming player. Funds then can be dispensed to the jackpot payment user to equip him for further pouch-pay transactions.

A jackpot transaction form can be printed with indicia that a witnessing attendant was not required for the hand-payment. The FJP also can dispense reimbursing funds to the payment user.

Parameters of the jackpot transaction and payment can be stored in a jackpot payment database. Parameters of the jackpot value credit authorization can include the jackpot value, a gaming machine identifier, gaming machine chronological data, and a jackpot payment user identifier. Such data can be used by the casino for, e.g., internal control procedures or compliance with regulatory requirements.

The present method alternatively can determine a pouch-pay value limit of the payment attendant. A payment user identifier can be compared with a look-up table of payment user value limits. If the jackpot value is not greater than the value limit of the payment user, a witness-less pouch-pay procedure can be authorized. If the payment user is not permitted to hand-pay a jackpot of that magnitude, the jackpot center server can decline to authorize a witness-less pouch-pay jackpot transaction.

Figure 6:
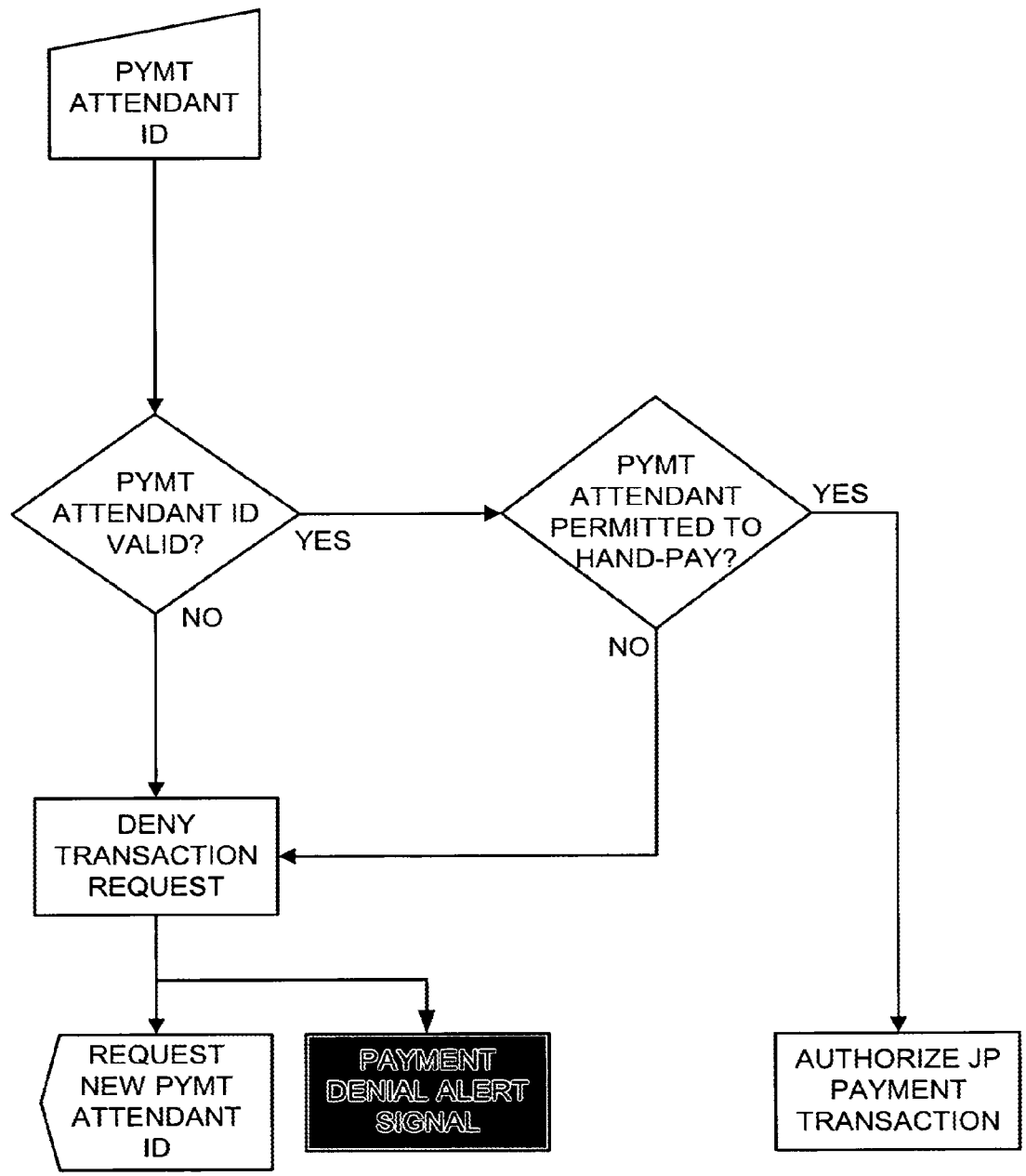
FIG. 6 is a flowchart showing one embodiment of a verification step in the witness-less jackpot payment method as described herein.

The present method can alternatively include a determination by the jackpot processing center of whether the payment attendant has permission to perform jackpot hand-payments (FIG. 6). A payment user identifier can be compared with a look-up table of permitted payment users. If the payment user is not permitted to hand-pay a jackpot, the jackpot processing center can decline to authorize the jackpot transaction. A record of the decline also can be logged.

The above method provides several advantages over conventional hand-pay methodologies. First, logging of the jackpot payment provides improved financial control and oversight. Electronic hand-pay witnessing reduces the risk of employee fraud, both by electronically documenting the payment and by minimizing the role of employees in the hand-pay procedure.

The gaming experience also is enhanced for the player, as delays in hand-paying a jackpot are reduced. Reduction in gaming machine lock time increases casino gaming activity and potential revenue. Lastly, minimization of personnel involvement reduces labor costs for the casino.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and sub-combinations of the various elements, features, functions and/or properties disclosed herein.

What is claimed is:

1. A method for corroborating a gaming machine jackpot payment, comprising:
   generating a jackpot winning signal by a gaming machine corresponding to a jackpot won by a player of the gaming machine, said jackpot winning signal including an amount of a jackpot value;
   determining a jackpot payment user authorization via a jackpot server,
   i) by identifying a jackpot payment user by comparing a jackpot user identification code entered at the gaming machine to a stored jackpot payment user identification code;
   ii) determining whether there is jackpot manual payment permission associated with said jackpot payment user; and if the jackpot payment user does not have an associated jackpot manual payment permission generating a jackpot manual payment permission request for the jackpot payment user;
   electronically corroborating the amount of the jackpot value of said jackpot winning signal by comparing the amount of the jackpot value of said jackpot winning signal to an amount of a jackpot manual witness payment value via the jackpot server, wherein the jackpot manual witness payment value is a selectable value on the server;
   declining to authorize the jackpot payment user to credit the jackpot value to the winning player if the amount of the jackpot value of said jackpot winning signal is greater than the amount of the jackpot manual witness payment value; or verifying the jackpot value if the amount of the jackpot value of said jackpot winning signal is equal to the amount of the jackpot manual witness payment value;

determining whether authorization was granted as a result of the jackpot manual payment permission request to pay the jackpot value to the player without the requirement for a human jackpot payment corroborating witness; and if such authorization was granted;

authorizing the jackpot payment user to credit the jackpot value to the winning player without a human jackpot payment corroborating witness if:

the amount of the jackpot value of said jackpot winning signal is equal to the amount of the jackpot manual witness payment value;

the jackpot user identification code matches the stored jackpot payment user identification code; and the associated jackpot manual payment permission exists or authorization was granted as the result of the jackpot manual payment permission request; and creating a jackpot transaction record at the jackpot server indicating authorization of a transfer of the jackpot value without a human jackpot payment corroborating witness including printing a jackpot payment transaction receipt having indicia indicating that authorization was granted without the requirement for a human jackpot payment corroborating witness.

2. The method of claim 1 wherein the jackpot winning signal includes at least one of chronological data or a gaming machine identifier.

3. The method of claim 1 wherein determining a jackpot payment user authorization comprises determining a jackpot manual payment permission of the jackpot payment user.

4. The method of claim 1, further comprising: logging the jackpot manual payment permission request.

5. The method of claim 1, further comprising: crediting the amount of the jackpot value to the winning player.

6. The method of claim 5 wherein crediting the amount of the jackpot value to the winning player comprises dispensing to the winning player cash equal to the amount of the jackpot value, dispensing to the winning player a check in the amount of the jackpot value, assigning a credit equal to the amount of the jackpot value to a credit meter of the gaming machine, or assigning a credit equal to the amount of the jackpot value to an account of the winning player.

7. The method of claim 1, further comprising: storing parameters of the jackpot value credit authorization in a jackpot payment database.

8. The method of claim 7 wherein parameters of the jackpot value credit authorization include at least one of the jackpot value, a gaming machine identifier, gaming machine chronological data, and a jackpot payment user identifier.

9. A method for electronically corroborating and paying a gaming machine jackpot, comprising:

generating a jackpot payment transaction request by a jackpot payment user via a gaming machine, the jackpot payment transaction request including a jackpot payment user identifier and a jackpot payment request value indicating an amount of a jackpot won at the gaming machine, and wherein the jackpot payment user identifier identifies the jackpot payment user;

determining a jackpot payment user authorization via a jackpot server, i) by identifying the jackpot payment user by comparing a jackpot user identification code entered at the gaming machine to a stored jackpot payment user identification code;

ii) determining whether there is jackpot manual payment permission associated with said jackpot payment user; and if the jackpot payment user does not have an associated jackpot manual payment permission generating a jackpot manual payment permission request for the jackpot payment user;

electronically corroborating the amount of the jackpot value of the jackpot payment request by:

i) verifying via the jackpot server that the amount of the jackpot payment request value is equal to a jackpot value of a jackpot signal transmitted from a gaming machine which indicates an amount of a jackpot won at the gaming machine;

ii) comparing the jackpot payment request value of the jackpot payment transaction request to a jackpot witness-less manual payment value wherein the jackpot witness-less manual payment value is a selectable value on the server; and if the jackpot payment request value is less than or equal to the jackpot witness-less manual payment value, authorizing the jackpot payment transaction request without a payment corroboration witness requirement; or, if the jackpot payment request value is greater than the maximum jackpot witness-less manual payment value, requiring a jackpot payment corroborating witness;

determining whether authorization was granted to pay the verified jackpot value to the player without the requirement for a human jackpot payment corroborating witness;

authorizing the jackpot payment user to credit the jackpot value to a winning player of the gaming machine without the jackpot payment corroborating witness if:

the jackpot user identification code matches the stored jackpot payment user identification code, the associated jackpot manual payment permission exists or authorization was granted as a result of the jackpot manual payment permission request the jackpot payment request value was electronically corroborated, and the jackpot payment request value is less than or equal to the jackpot witness-less manual payment value, and printing a jackpot payment transaction receipt by a printer including indicia that a determination was made that a human jackpot payment corroborating witness was not required for the transfer of the verified jackpot value.

10. The method of claim 9 wherein the jackpot signal further includes at least one of a gaming player identity value, a gaming machine identity value, a chronological value, or gaming outcome data.

11. The method of claim 9 wherein verifying the jackpot value comprises correlating the jackpot signal value with the jackpot payment request value.

12. The method of claim 11, further comprising:

rejecting the jackpot payment transaction request if the jackpot signal value is not equal to the jackpot payment request value; and storing the jackpot payment transaction request rejection.

13. The method of claim 12 wherein transferring the jackpot value comprises crediting the jackpot value to a player account.

14. The method of claim 9, further comprising: transferring the jackpot value from the jackpot payment user to the player of said gaming machine.

15. The method of claim 14 wherein transferring the jackpot value to a player comprises physically transferring a tangible value medium from the jackpot payment user to the player.

16. The method of claim 9, further comprising: storing jackpot value transfer data in a jackpot payment data log.

17. The method of claim 16 wherein storing jackpot value transfer data comprises storing data representing at least one of the jackpot signal or the jackpot payment transaction request.

18. The method of claim 9 wherein authorizing a jackpot value transfer comprises:
    determining if the jackpot payment user has an associated jackpot manual payment permission;
    approving the jackpot payment transaction request if the jackpot payment user has an associated jackpot manual payment permission; and
    assigning a jackpot value transfer authorization code.

19. The method of claim 18 wherein: storing jackpot value transfer data comprises storing the jackpot payment transaction request and the jackpot value transfer authorization code.

20. The method of claim 18, further comprising: rejecting the jackpot payment transaction request if the jackpot payment user is not associated with jackpot manual payment permission on the server.

21. The method of claim 18, further comprising:
    comparing the jackpot payment request value to a jackpot payment value limit associated with the jackpot payment user;
    approving the jackpot payment transaction request if the jackpot payment request value is equal to or less than the jackpot payment value limit; and
    rejecting the jackpot payment transaction request if the jackpot payment request value is greater than the jackpot payment value limit.

22. A method for corroborating a gaming machine jackpot payment, comprising:
    receiving a jackpot signal from a gaming machine via a jackpot server, said jackpot signal corresponding to a jackpot won by a player of the gaming machine and including an amount of a jackpot value;
    receiving a jackpot payment request via the jackpot server initiated by a jackpot payment attendant, said jackpot payment request including a user identification signal and a jackpot payment value inputted by the payment attendant, the user identification signal identifying the payment attendant with a user identification code and the jackpot payment value indicating an amount of a jackpot won by the player;
    determining a jackpot payment authorization for the jackpot payment attendant by comparing the user identification code with a stored jackpot payment user identification code;
    comparing the amount of the jackpot value and the amount of the jackpot payment value inputted by the payment attendant via the jackpot server in order to electronically corroborate the amount of the jackpot value; and
    determining whether authorization was granted to pay the jackpot value to the player without the requirement for a human jackpot payment corroborating witness;
    authorizing the jackpot payment attendant to pay the jackpot value to the winning player at the gaming machine without a human jackpot payment corroborating witness if:
    the amount of the jackpot value and the amount of the jackpot payment value are equal such that the amount of the jackpot value is electronically corroborated,
    the user identification code matches the stored jackpot payment user identification code,
    the payment attendant has jackpot payment permission, and
    authorization was granted to pay the jackpot value to the player without the requirement for the human jackpot payment corroborating witness;
    paying the jackpot value to the winning player;
    storing parameters of the jackpot value payment in a jackpot payment database; and
    printing a jackpot transaction record including indicia indicating that whether authorization of a transfer of the jackpot value was granted without a human jackpot payment corroborating witness.

23. A method for corroborating a gaming machine jackpot payment, comprising:
    receiving a jackpot signal from a gaming machine via a jackpot server, said jackpot signal corresponding to a jackpot won by a player of the gaming machine and including an amount of a jackpot value;
    receiving a jackpot payment request via the jackpot server initiated by a jackpot payment attendant, said jackpot payment request including a user identification signal and a jackpot payment value inputted by the payment attendant, the user identification signal identifying the payment attendant and the jackpot payment value indicating an amount of a jackpot won by the player;
    receiving a jackpot reimbursement request from a jackpot payment attendant at a value station remote from the gaming machine, said transaction reimbursement request including the user identification signal;
    comparing the user identification signal of the jackpot reimbursement request with the user identification signal of the jackpot payment request;
    authorizing a reimbursement of the jackpot value to the jackpot payment attendant if the user identification signals match;
    determining whether authorization was granted to pay the jackpot value to the player without the requirement for a human jackpot payment corroborating witness;
    paying the jackpot value to the winning player if:
    the user identification signal matches a stored jackpot user identification code,
    the payment attendant has jackpot payment permission,
    the amount of the jackpot value is electronically corroborated by a comparison of the amount of the jackpot value indicated in the jackpot signal and the jackpot payment value indicated in the jackpot payment request, and
    authorization was granted to pay the jackpot value to the player without the requirement for the human jackpot payment corroborating witness;
    storing parameters of the jackpot value payment in a jackpot payment database; and
    printing a jackpot transaction record including indicia indicating that whether authorization of a transfer of the jackpot value was granted without a human jackpot payment corroborating witness.

24. An article comprising a storage medium, said storage medium having stored thereon instructions that, when executed by a computing device, result in:
    receiving a jackpot winning signal from a gaming machine via a jackpot server, said jackpot signal including an amount of a jackpot value of a jackpot won by a player;
    receiving a payment user transaction signal via the jackpot server, said transaction signal including a payment user identifier and a jackpot transaction value inputted by a payment attendant, the payment user identifier identifying the payment attendant and the jackpot transaction value indicating an amount of a jackpot won by the player;

determining the payment attendant authorization via the jackpot server by:
  i) comparing the payment user identifier to a stored jackpot payment user identification code;
  ii) determining whether there is jackpot there is jackpot payment permission associated with the payment attendant;

electronically corroborating the amount of the jackpot value of said jackpot signal by comparing the amount of the jackpot value of said jackpot signal to the amount of the jackpot transaction value of said transaction signal inputted by the payment attendant via the jackpot server and generating a confirmed jackpot value if the amount of the jackpot value of said jackpot signal is equal to the amount of the jackpot transaction value of said transaction signal;

determining whether authorization was granted to pay the confirmed jackpot value to the player without the requirement for a human corroborating payment witnessing user;

authorizing transfer of the confirmed jackpot value to the player without a requirement for a human corroborating payment witnessing user if:
  the amount of the jackpot value of said jackpot signal is equal to the amount of the jackpot transaction value of said transaction signal,
  the user identifier matches the stored jackpot payment user identification code,
  the payment attendant has jackpot payment permission, and
  authorization was granted to pay the confirmed jackpot value to the player without the requirement for a human corroborating payment witnessing user; and creating a record of the authorized transfer which includes indicia indicating that a determination was made that authorization was granted without the requirement for a human corroborating payment witnessing user.

\* \* \* \* \*